United States Patent
Duff et al.

(10) Patent No.: US 8,842,563 B1
(45) Date of Patent: Sep. 23, 2014

(54) COMMUNICATION AND PROCESSING FOR POWER LINE COMMUNICATION SYSTEMS

(75) Inventors: John F. Duff, Breezy Point, MN (US); Scott H. Christiansen, Brainerd, MN (US); Rolf Flen, Pequot Lakes, MN (US); Verne Olson, Pequot Lakes, MN (US)

(73) Assignee: Landis + Gyr Technologies, LLC, Pequot Lakes, MN (US)

( * ) Notice: Subject to any disclaimer, the term of this patent is extended or adjusted under 35 U.S.C. 154(b) by 271 days.

(21) Appl. No.: 13/335,426

(22) Filed: Dec. 22, 2011

(51) Int. Cl.
*G04B 23/00* (2006.01)
*H04B 3/54* (2006.01)

(52) U.S. Cl.
USPC .................................................. 370/252

(58) Field of Classification Search
CPC .................................................. G01D 4/002
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |
| 8,144,816 B2 | 3/2012 | Bonicatto et al. | |
| 8,144,820 B2 | 3/2012 | Bonicatto | |
| 8,194,789 B2 | 6/2012 | Wolter et al. | |
| 8,238,263 B2 | 8/2012 | Kohout et al. | |
| 8,311,863 B1 * | 11/2012 | Kemp | 705/7.11 |
| 2008/0304595 A1 | 12/2008 | Haug et al. | |
| 2010/0064001 A1 * | 3/2010 | Daily | 709/203 |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0026007 A1 * | 2/2012 | Beattie | 340/870.02 |
| 2012/0057592 A1 | 3/2012 | Zeppetelle et al. | |
| 2012/0076212 A1 | 3/2012 | Zeppetelle et al. | |
| 2012/0084559 A1 | 4/2012 | Bonicatto | |

(Continued)

*Primary Examiner* — John Blanton
(74) *Attorney, Agent, or Firm* — Crawford Maunu PLLC

(57) ABSTRACT

Aspects of the present disclosure are directed towards a data retrieving engine that is designed to retrieve interval data from the endpoint devices that is communicated for indicating utility usage readings. The interval data is provided at least once for each interval period (used by each of the endpoint devices). The data retrieving engine is additionally designed for retrieving, from the endpoint devices, other different type of data, which is transmitted over a time period that overlaps multiple interval periods. In certain implementations, the system allows a dynamic adjustment to a ratio of the respective amounts for each type of data.

20 Claims, 10 Drawing Sheets

(56) References Cited

U.S. PATENT DOCUMENTS

| | | |
|---|---|---|
| 2012/0106664 A1 | 5/2012 | Bonicatto et al. |
| 2012/0119922 A1* | 5/2012 | O'Neil .................. 340/870.02 |
| 2012/0195683 A1* | 8/2012 | O'Connell .................... 404/6 |
| 2012/0296490 A1* | 11/2012 | Fausak et al. ................. 700/297 |
| 2012/0316808 A1* | 12/2012 | Frader-Thompson et al. . 702/61 |
| 2013/0009788 A1* | 1/2013 | Langenberg et al. .... 340/870.02 |
| 2013/0187788 A1* | 7/2013 | Salter ...................... 340/870.02 |
| 2013/0285835 A1* | 10/2013 | Kim et al. ................ 340/870.02 |

* cited by examiner

COMMUNICATION AND PROCESSING FOR POWER LINE COMMUNICATION SYSTEMS

BACKGROUND

Service providers utilize distributed networks to provide services to customers over large geographic areas. For example, power companies use power distribution lines to carry power from one or more generating stations (power plants) to residential and commercial customer sites. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout several geographic regions and to receive data representing power usage. However, data communication in a system that contains many thousands of endpoint devices, each communicating over the power distribution lines, can be particularly challenging. The sheer number of endpoint devices contributes to a host of issues including synchronization, communication bandwidth and cost concerns.

For instance, the noise on power distribution lines can create problems with transmission between the many different devices. In other instances, the system bandwidth requirements can vary across different applications and even over time. These requirements can sometimes be linked to different types of data. Different types of data can also have different requirements relative to the rate of transmission and to timing delays in making the data available to users of the system.

SUMMARY

The present disclosure is directed to systems and methods for use with processing of data communications that are carried power lines and with regards to systems having many endpoints. These and other aspects of the present disclosure are exemplified in a number of illustrated implementations and applications, some of which are shown in the figures and characterized in the claims section that follows.

Embodiments of the present disclosure are directed toward an apparatus for communicating utility-usage data with endpoint devices over power distribution lines that carry power using alternating current (AC). A data retrieving engine is configured and arranged to retrieve, from data originating from the endpoint devices, interval data of a first type and of a second different type of data sets. The first type is indicative of utility usage readings and available for retrieval at least once per an interval period. The second type is available for retrieval based on transmissions of the second type of data sets that span at least two interval periods. A packet processing engine is configured and arranged to access first and second application-customized packing lists and to respond to the data as retrieved by the data retrieving engine by extracting the data sets of the first type and of the second type and forming groups of discrete values of the extracted data sets of the first type and of the second type based respectively on the first and second packing lists. The packet processing engine is also configured and arranged to generate data packets in response to and as a function of the groups. A packet reading engine is configured and arranged to interpret the generated data packets according to a set of packet-communication rules, and output therefrom interpreted data indicative of the data sets of the first type and of the second type, including interpreted data indicative of the retrieved utility usage readings, for communicating data, including both types of data sets, on behalf of a utility provider.

Certain aspects of the instant disclosure are directed towards devices and systems that can be useful for communicating utility-usage data from many endpoint devices to a command center. The communications with the endpoint devices occur over power distribution lines that carry power using alternating current (AC). The command center can include, for instance, a data retrieving engine, a packet processing engine, and a packet reading engine. A data retrieving engine can be configured to retrieve interval data from data originating from the endpoint device. The interval data includes data for utility usage readings and is provided at least once for each interval period. The data retrieving engine can be designed for retrieving, from the endpoint devices, another different type of data. These different types of data are transmitted over a time period that overlaps multiple interval periods. In certain implementations, the system allows a dynamic adjustment to a ratio between the respective amounts for each type of data.

Other embodiments are directed toward the use of switching groups to process data from endpoint devices. The switching groups include collectors designed to communicate with many endpoints over a power distribution line. Each switching group represents a set of collectors with which an endpoint may be able to communicate. Thus, data transmitted by an endpoint could be received by multiple collectors within an associated switching group. Aspects of the present disclosure relate to selecting data from an appropriate collector of a switching group.

The packet processing engine can be configured to provide multiple functionalities. For instance, the packet processing engine can be designed to extract the interval data from a series of data bits received from the endpoint devices, and map the extracted interval data to data fields using an interval packing list. The packet processing engine can also extract the other different types of data, transmitted at times overlapping interval periods, from the series of data bits received from the endpoints. The extracted other type of data can be mapped, by the packet processing engine, to data fields using another different type of packing list, and data packets are generated according to the mappings. The data packets represent the extracted interval data and the extracted other types of data. The packet reading engine, utilized in apparatuses consistent with the instant disclosure, can be configured to transform the generated data packets, based on a set of packet-communication rules, and provide interpreted data (based on the transformed generated data packets) indicative of the retrieved utility usage readings and of different types of data for applying the utility usage readings in communication between a utility provider and an entity associated with the utility usage readings.

Aspects of the instant disclosure are also directed towards methods for transmitting data over power lines carrying power using alternating current. Such methods can involve collecting, at an endpoint device, utility usage readings at least once per an interval period. A first set of data, which includes the utility usage readings, is classified as not divisible over the interval period. Additionally, a second set of data is classified as divisible over the interval period, and divided based on a mapping (or data packing) list. A transmission block of data is generated. The transmission block includes the first set of data, and a portion of the second set of data, which is transmitted during a single interval period. The transmission block is generated in response to a stored parameter that defines a ratio of a size of the first set of data to a size of the portion of the second set of data set.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

Figure 1:
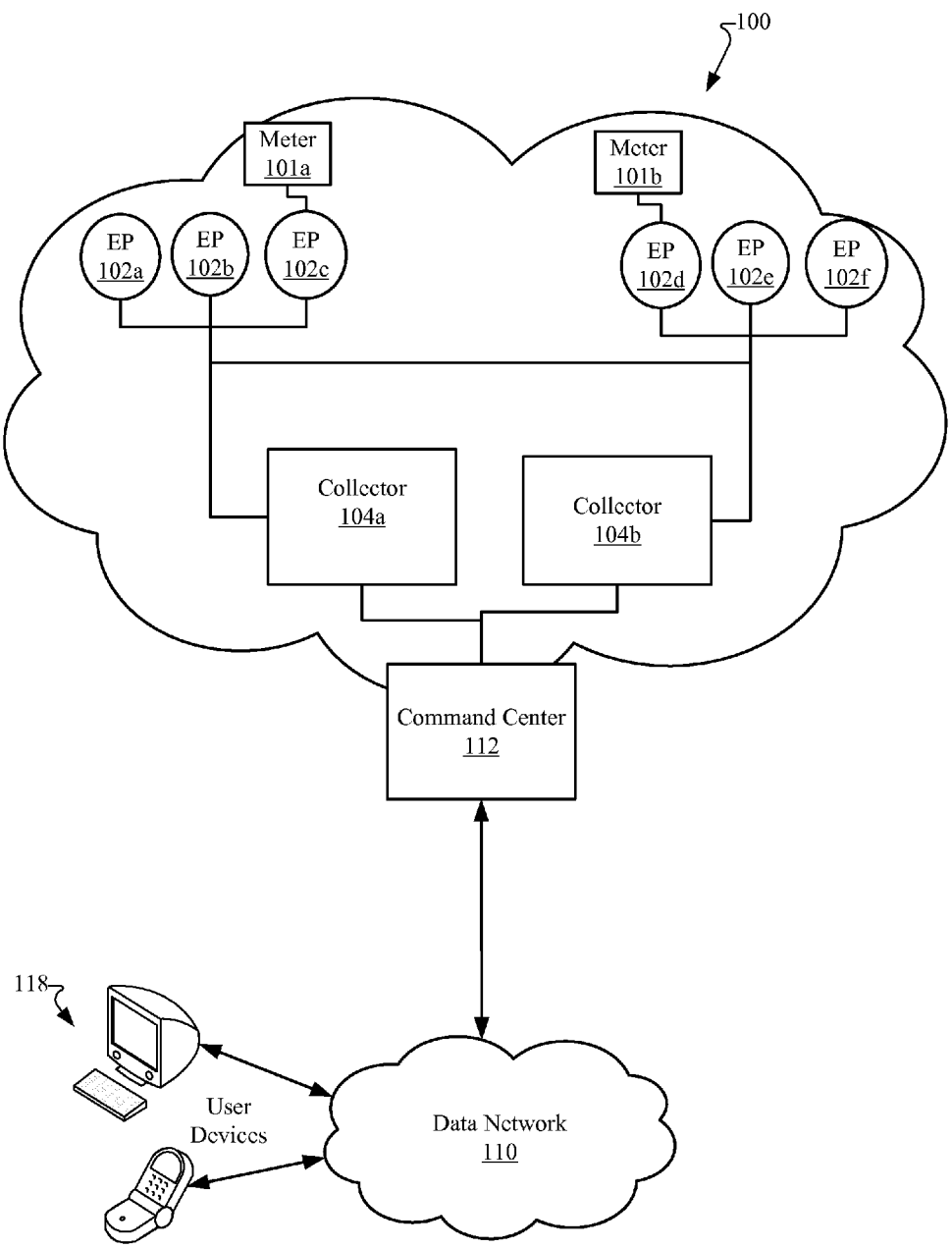
FIG. 1 shows a block diagram of an example network environment in which endpoints communicate data with collector units, consistent with embodiments of the present disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present disclosure are believed to be applicable to a variety of different types of devices, systems and arrangements, including those that may be implemented for use in data processing of data received from endpoints in a power-line communications system. While the present disclosure is not necessarily limited to such applications, various aspects of the disclosure may be appreciated through a discussion of various examples using this context.

Consistent with an embodiment of the present disclosure, a system is configured to communicate two simultaneous streams of data. The first stream includes data representing energy or other data (e.g., for testing, diagnostics and/or metering-related data) on a fast reporting/interval basis (e.g., reporting every 1-60 minutes). The second stream can include data that is communicated over a longer basis (e.g., a configurable number of packets data per day, such as 1-4 packets of data per day). This second data can include, for instance, billing information and longer term power quality metrics. For a given communication interval, the ratio between how many bits are in each stream can be adjusted to compensate for different configurations and system requirements. Thus, the bandwidth allocated to the first stream can be increased by decreasing the bandwidth allocated to the second stream and vice versa.

Other embodiments are directed toward the use of switching groups to process data from endpoint devices. The switching groups include collectors designed to communicate with many endpoints over a power distribution line. The switching group includes the set of collectors for which an endpoint may be able to communicate. Thus, data transmitted by an endpoint could be received by any of the collectors within an associated switching group. Aspects of the present disclosure relate to selecting data from an appropriate collector of a switching group. This can be particularly useful in a backfeed situation wherein the AC power is redirected in the distribution system (or other change) which might result in one or more collectors losing or gaining connection with an endpoint device.

Certain embodiments of the instant disclosure are directed to an apparatus for communicating utility-usage data with endpoint devices over power distribution lines, where the power distribution lines carry power using alternating current (AC). The apparatus can include a data retrieving engine, a packet processing engine, and a packet reading engine. The data retrieving engine is designed to retrieve, from endpoint devices, interval data communicated for indicating utility usage readings. The interval data is provided at least once per an interval period, and the interval period is used by each of the endpoint devices. The data retrieving engine is also configured and arranged for retrieving, from the endpoint devices, another different type of data. This other type of data is transmitted over a time period that overlaps multiple interval periods.

In particular embodiments, the other type of data is broken into pieces and transmitted over multiple interval periods. This can be particularly useful for allowing the other type of data (sometimes referred to as long packet data) to be transmitted without disruption of the interval data.

Other embodiments of the present disclosure are directed toward reducing communication bandwidth using shared definitions relative to how data is packaged during transmission (also referred to as packing lists). The packing lists can be particularly useful for reducing data overhead. For instance, an interval/short packing list may define that the first three bytes of data represent electrical power meter readings and that the next two bytes represent water usage meter readings. Using the packing list, the values can be sent without additional index/header information otherwise used to define the bytes. Rather, a data retrieving engine can match received data to the definitions provided by the packing lists.

Other aspects of the present disclosure relate to providing packet lists that are reconfigurable. The reconfiguration can include changing the definition of the data values and/or changing the data size of the packing list. Changing the definition allows the endpoints to transmit different data (e.g., new/different meter readings).

Consistent with various embodiments of the present disclosure, the packet processing engine is configured and arranged to perform multiple functions. For instance, the packet processing engine can be configured to extract the interval data from a series of data bits received from the endpoint devices, and to map the extracted interval data to data fields using an interval packing list. In certain embodiments, the data fields of the interval packing list correspond to meter reading values, and, in those embodiments, interval data communicated from different endpoint devices is mapped using different interval packing lists. The packet processing engine can also be configured to extract the other different type(s) of data (transmitted at times which overlap interval periods) from the series of data bits received from the endpoints. Additionally, the packet processing engine can map the extracted other type of data to data fields using another different type of packing list, and generate data packets according to the mappings. The data packets represent the extracted interval data and the extracted other types of data. In certain specific embodiments, the other types of data include long packets that are generated from an aggregation of multiple bits communicated over multiple interval periods. In certain embodiments, interval data is also communicated during each of the multiple interval periods.

The packet reading engine can be designed to transform the generated data packets according to a set of packet-communication rules, and provide interpreted data, based on the transformed data packets. The interpreted data is indicative of the retrieved utility usage readings and of different types of data. The utility usage readings can be communicated between a utility provider and an entity (e.g., a customer) associated with the utility usage readings.

According to other embodiments, multiple packets are coordinated based upon respective collectors switching groups before a packet is provided to the packet reading engine. This coordination can include selecting the best packet from multiple versions of the same packet received from a collector switching group. The packet reading engine can be further designed to detect an alarm event in the extracted (interval) data. Moreover, other embodiments of the apparatus can have a packet reading engine that is further configured and arranged to detect asynchronous packets that do not correspond to either the interval packing list, or the different type of packing list.

Aspects of the present disclosure are directed toward coordinating communications relative to intermediary nodes (sometimes referred to as collectors) that are located between endpoints and a central command center. The endpoints can switch among a set of collectors within a "switching group" as necessary, for example in a power line backfeed situation. Accordingly, the command center can be configured to account for the ability of each/any collector in a switching to provide data from a particular endpoint of the switching group. Thus, multiple collectors can provide data from the same endpoint. A readings engine operating at the command center can then select the best input/collector for each endpoint and for any given interval. This can be particularly useful for compensating for a dynamic environment in which the integrity of communications between an endpoint and any one collector can change. The readings engine can smoothly and automatically handle situations, such as backfeeds, with reduced (or no) loss of data.

This instant disclosure is also directed towards methods for transmitting data over power distribution lines that carry power using alternating current (AC). Example embodiments of the method include collecting, at an endpoint device, utility usage readings at least once per an interval period, and classifying a first set of data as not divisible over the interval period. The first set of data includes the utility usage readings. Further, the method classifies a second set of data as divisible over the interval period, and divides the second set of data according to a mapping list. The method additionally includes generating a transmission block of data, which includes the first set of data and a portion of the second set of data. The method also includes transmitting the block of data during a single interval period.

In certain embodiments of methods of transmitting data over power distribution lines, the method additionally includes, during another interval period, transmitting a second block of data (having another portion of the second set of data).

Turning now to the figures, FIG. 1 shows a block diagram of an example network environment 100 in which endpoints 102, via meters 101a and 101b. communicate data with collector units 104, consistent with embodiments of the present disclosure. The network environment 100 includes a service network in which a plurality of endpoints 102a-102f are coupled (e.g., communicatively coupled) to collector units 104a, 104b. Consistent with embodiments of the present disclosure, the endpoints 102 can provide data from utility meters. For instance, data can be provided from power meters, gas meters and water meters, which are respectively installed in gas and water distribution networks. Moreover, while the present disclosure generally refers to the endpoints 102 as providing utility data (e.g., power) from utility meters, other data can also be communicated.

Consistent with embodiments of the present disclosure, each collector 104 can be configured to be in communication with thousands of endpoints 102 and there can be thousands of collectors 104 in connection with a command center 112. Thus, there can be millions of total endpoints and many thousands sharing communications on a common power distribution line. Accordingly, embodiments of the present disclosure are directed toward communicating, coordinating and interpreting data relative to constraints of the system. The following discussion provides an overview of various aspects of the system as relevant to some of these constraints.

The endpoints 102 can be designed to monitor and report various operating characteristics of the service network. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

The endpoints 102 report the operating characteristics of the network using communications channels. In certain embodiments, the communications channels are represented by portions of the frequency spectrum. The center frequency and bandwidth of each communications channel can depend on the communications system in which they are implemented. In some implementations, the communications channels for utility meters (e.g., power, gas and/or water meters) can be transmitted using power line communication networks that allocate available bandwidth between endpoints according to an orthogonal frequency division multiple access (OFDMA) spectrum allocation technique or another channel allocation technique.

When the endpoints 102 are implemented for use with power meters in a power distribution network, the endpoints 102 and/or power meters transmit reporting data that specify updated meter information. The updated meter information can include measures of total power consumption, power consumption over a specified period of time, peak power consumption, instantaneous voltage, peak voltage, minimum voltage and other measures of related to power consumption and power management (e.g., load information). Each of the endpoints 102 and/or power meters can also transmit other data, such as status data (e.g., operating in a normal operating mode, emergency power mode, or another state such as a recovery state following a power outage).

In some implementations, symbols (representing one or more bits, which in turn can represent reporting and/or the status data) are transmitted on the power distribution lines over a specified symbol period. A symbol period is a period of time over which each symbol is communicated. A number of symbols are contained within a frame period, representing the time over which a complete frame is communicated.

In FIG. 1, endpoints 102a-102c and 102d-102f transmit symbols over communications channels to collector units 104a, 104b, respectively. The collector units 104 can include circuitry (e.g., including one or more data processors) that is configured and arranged to communicate with the endpoints 102 over power distribution lines. The collector units 104 can also include circuitry for interfacing with a command center 112. The interface to the command center 112 can be implemented using a variety of different communication networks including, but not limited to, a wide-area network (WAN) using Ethernet.

According to certain embodiments of the present disclosure, the collectors are installed in substations and used to control bidirectional communication with both the command center 112 (e.g., located at a utility office) and endpoints (e.g., located at metering locations for customer sites). This messaging to the endpoints 102 can be sent to an individual endpoint, or broadcast simultaneously to a group of endpoints 102 or even sent to all endpoints 102 connected to the collectors 104. Consistent with certain embodiments, the collectors 104 are built according to an industrial-grade computer specification in order to withstand the harsh environment of a substation.

In certain embodiments of the present disclosure, the collector(s) 104 can receive data from many different endpoints 102 while storing the data in a local database. While the collector can operate largely in a pass-through mode in which collected data is forwarded to the command center 112, the collector can also take action based on the data received from the endpoints (e.g., data validation/authentication, substation-equipment data-collecting and monitoring) and transmit data received from the endpoints 102 to a command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received from endpoints 102. For example, the user devices 118 might be owned by utility provider operator, maintenance personnel and/or customers of the utility provider. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to user devices 118. Similarly, if there has been a power outage, the command center 112 can provide data to user devices 118 that are accessible by customers to provide information regarding the existence of the outage and potentially provide information estimating the duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks.

Symbols from a particular endpoint may be transmitted over any one of thousands of communications channels in a PLC system. For example, each endpoint can be assigned a particular channel using OFDMA or another channel allocation technique. Channel assignments for the endpoints 102a-102c, 102d-102f that communicate with particular collectors 104a, 104b can be stored for access by the command center 112 and/or the collectors 104a, 104b.

Particular embodiments of the present disclosure relate to command center operations for efficiently and effectively receiving, decoding and processing of data received from the numerous endpoint devices. For instance, each endpoint can be assigned to a configuration profile. The configuration profile can define packing list(s) and corresponding data sequences. This packing list defines what data is transmitted in each packet and is then used to decode the data (e.g., by correlating the data values to representative data fields). For optimization of readings processing, this data can be cached in memory by the readings engine.

Various embodiments allow the endpoint to be configured to send a variable number of interval data bits every reporting period (e.g., every 1-60 minutes). For instance, the data bits can be allocated for up to a configurable number (e.g., up to eight) of interval data items (such as energy, voltage, or any metering or related metric). The balance of the payload bits can then be allocated to longer packets. These longer packets can be used to transmit other data items supported by the endpoint and can span several interval periods. The long packet and interval data streams can be combined, forward error corrected and encrypted into one stream of data that the endpoints sends through its upstream transmitter.

Other embodiments of the present disclosure allow an additional type of data packet (referred to as an asynchronous request packet) to be transmitted to any endpoint. This asynchronous request packet can be sent at the start time of a packet or another time consistent with an underlying communication protocol and can cause the endpoint to deviate from the standard packet format (different from the normal (daily) packet). In one embodiment, the readings engine can accumulate bits of a packet before processing the bits further. The reading engine can detect the end of the packet through information carried in asynchronous bits that arrive periodically. In another embodiment, the readings engine can be configured to query a local database for a packet definition when it encounters the start of an asynchronous reading packet and can start processing sub-elements of the asynchronous response packet as soon as enough bits for each sub-element arrives, which allows for the processing to occur before the entire response packet is received. The local database can provide packet definition, which includes information for how to decode asynchronously sent data. After an asynchronous packet has been processed, the readings engine shifts back to normal (daily) packet processing.

Consistent with more particular embodiments of the present disclosure, certain asynchronous request packets correspond to a predetermined asynchronous response packet format. The endpoint can use the predetermined and locally stored format when responding. The readings engine can also be designed to identify and properly decode/process such asynchronous response packets.

Figure 2:
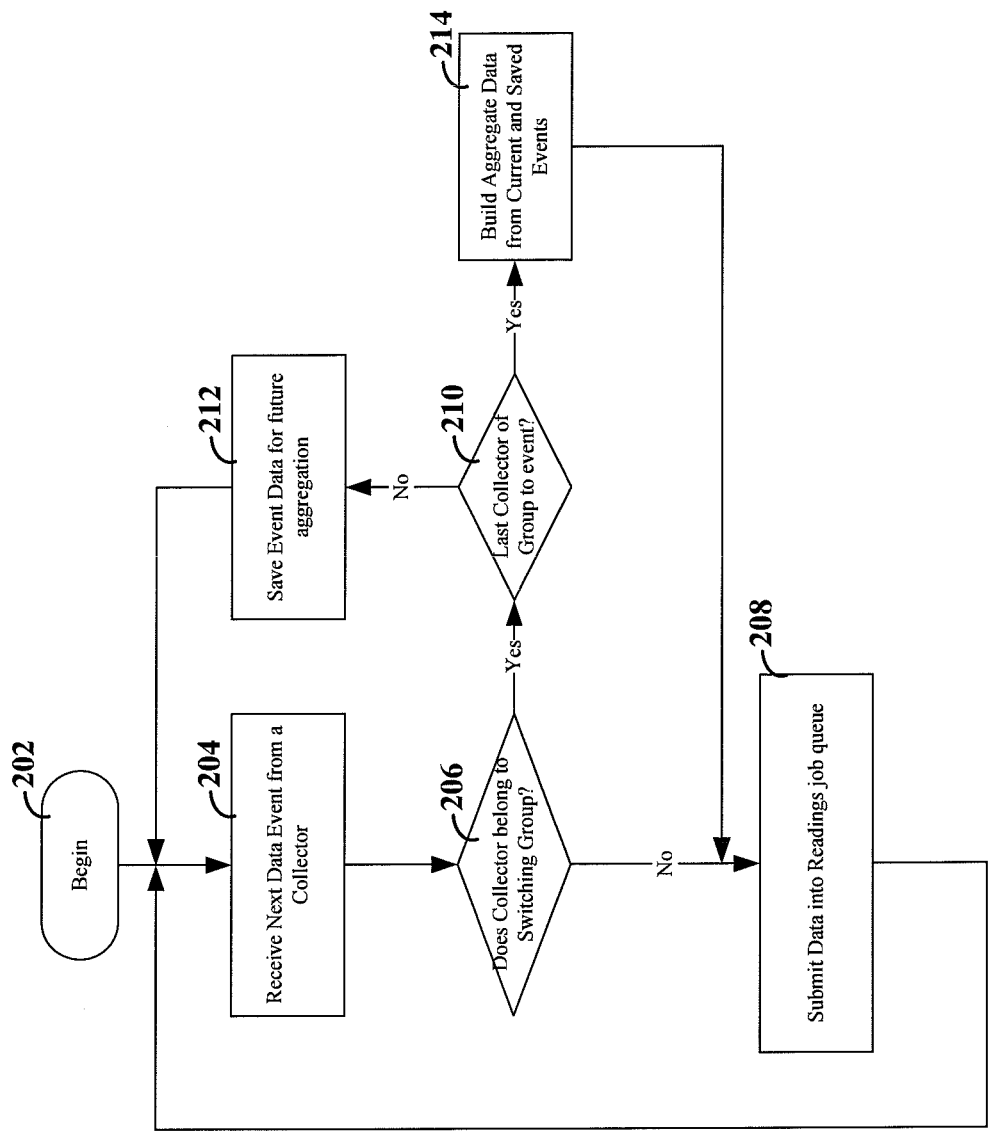
FIG. 2 depicts a flow diagram for a data retrieving engine, consistent with embodiments of the present disclosure.

FIG. 2 depicts a flow diagram for a data retrieving engine, consistent with embodiments of the present disclosure. Each endpoint device can be linked with a group of collectors that are in communication with the endpoint device. These collectors represent a collector switching group. Data from an endpoint can be received from any of the collectors that are part of a collector switching group and also from more than one of the collectors at a time. Accordingly, the data retrieving engine can be configured to account for collector switching groups by aggregating data from each collector switching group.

The process flow begins a step 202, and proceeds to block 204 when a new data event is received from a collector. The new data event includes an identifier of the collector from which the data originated. The data retrieving engine can then determine, at block 206, whether the collector belongs to a switching group. This determination can be made by, for instance, referencing local database storing switching groups.

If data retrieving engine determines that the collector is not a member of a switching group, then there would not be any other collectors that would provide data from the endpoint. Accordingly, the data retrieving engine submits the retrieved data to a readings job queue at block 208. If, however, the data retrieving engine is a member of a switching group, then there may be corresponding data from other collectors. The data retrieving engine then proceeds to block 210 where the data retrieving engine determines whether there might be data from any other collectors in the switching group (e.g., the current collector or the last collector in the switching group relative to the current data/event).

If there are additional collectors, then the data retrieving engine saves the current (event) data so that it can be aggregated with data that might be received from other collectors in the switching group, as depicted by block 212. The data retrieving engine then looks for another/next data event, which might correspond to other collectors in the switching group by advancing to block 204.

If, however, there are no additional collectors, then the data retrieving engine does not need to look for additional data. The data retrieving engine then proceeds to block 214 where any saved data for related events of the switching group are aggregated. The data retrieving engine then submits the aggregated data to the readings job queue, as shown by block 208. Consistent with embodiments of the present disclosure the data retrieving engine stores the event data in a local database. This local database (or another memory storage, such as the file system of the operating system) can be used by the data retrieving engine to store temporary data files for each switching group. After aggregation has occurred, the stored data can be removed from the database.

Figure 3:
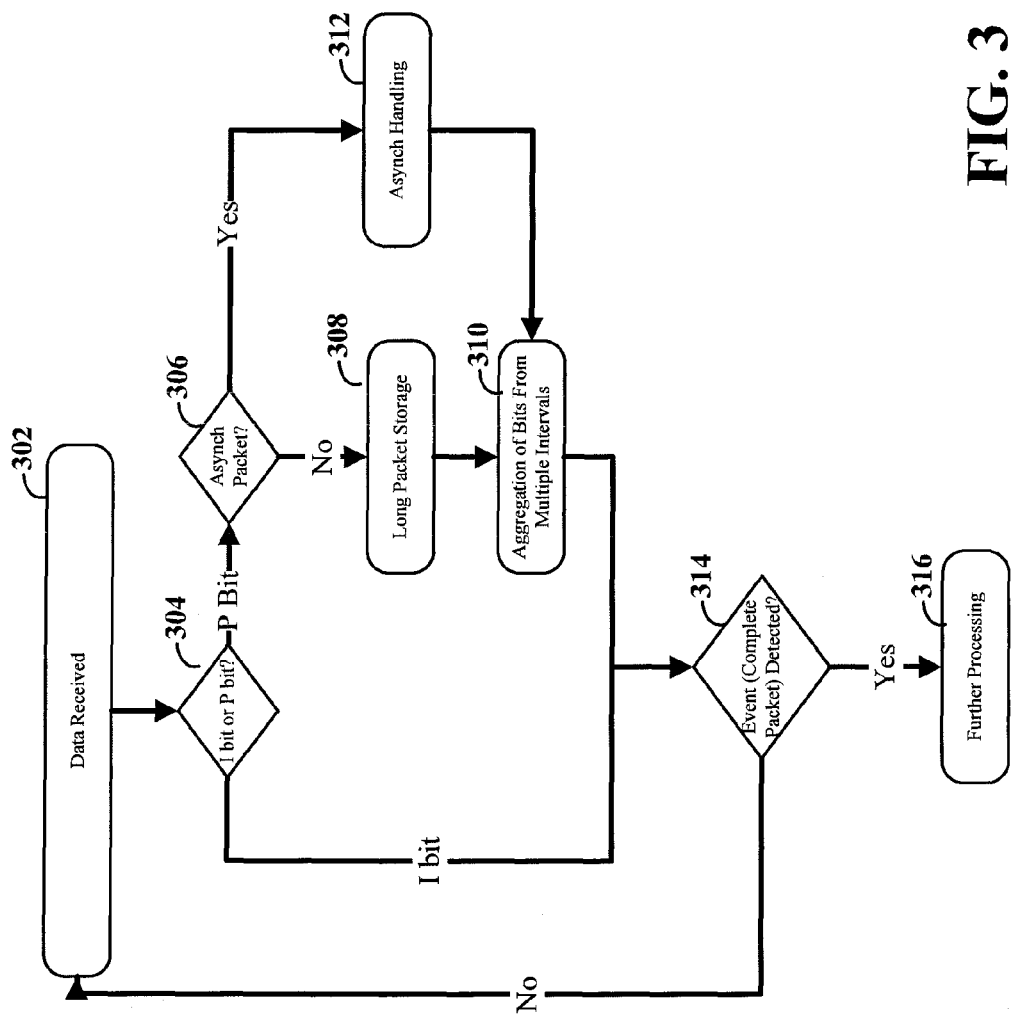
FIG. 3 depicts a flow diagram for processing received packets and generating data events, consistent with embodiments of the present disclosure.

FIG. 3 depicts a flow diagram for processing received packets and generating data events, consistent with embodiments of the present disclosure. The flow diagram depicts a mechanism for generating data events that can be used to drive the data retrieving engine. This particular embodiment includes at least three different packet types: short packets, long packets and asynchronous packets. In a particular example, the short packets can be used to transmit within a given interval period (e.g., thereby providing utility usage data every interval period). The long packets can be used to transmit data over several of the interval periods (e.g., by interleaving the long packet data with several of the multiple short packets). The asynchronous packets can be used to transmit alerts or other data and can be transmitted in place of long packets.

At block 302, data has been received but it is not yet known what type of packet the data represents. At block 304 a determination is made as to whether or not the data represents interval bits (I-bits) or other bits (P-bits). If the data does represent I-bits, then all data for the short packet can be provided within a single interval period. The process then determines, at block 314, whether or not an event has been detected. The event in this instance would be triggered once the data for a full short packet was received. The process can then submit the data for further processing, as part of block 316. If an event is not detected, then the process returns block 302 to allow for the receipt of additional data (e.g., to complete the short packet).

If the determination of block 304 is that the data is not I-bits, the process proceeds to block 306. At block 306 a determination is made as to whether or not the data is for an asynchronous packet. If the data is for an asynchronous packet, then the process proceeds to block 312 where the data is handled accordingly (e.g., using a packet definition for the particular asynchronous packet). The asynchronous packet can span several interval periods, but this is not required. Accordingly, the process can next proceed to step 310, where bits can be aggregated across several interval periods as necessary. The process then determines, at block 314, whether or not an event has been detected. The event in this instance would be triggered once the data for a full asynchronous packet has been received. The process can then submit the data for further processing, as part of block 316. If an event is not detected, then the process returns block 302 to allow for the receipt of additional data (e.g., to complete the packet).

If the data is not for an asynchronous packet, then the process proceeds to block 308. At block 308, the long packet data can then be processed and stored accordingly. A long packet can span several interval periods. Accordingly, the process can next proceed to step 310, where bits can be aggregated across several interval periods as necessary. The process then determines, at block 314, whether or not an event has been detected. The event in this instance would be triggered once the data for a full long packet has been received. The process can then submit the data for further processing, as part of block 316. If an event is not detected, then the process returns block 302 to allow for the receipt of additional data (e.g., to complete the packet).

The ability to distinguish between multiple different packet types can be particularly useful for handling large amounts of data from many different endpoint devices. For instance, short packets can use predefined short packing lists to reduce the amount of transmitted data as well as the processing required to decode the data. Similarly, long packets can also use predefined long packing lists. Asynchronous packets, which can be responsive to asynchronous packet requests, can be useful for providing flexibility for non-standard data communications (e.g., useful to communicate information about infrequent events or operations).

Consistent with embodiments of the present disclosure, error correction data is transmitted with the packets. In more particular embodiments, error correction code (ECC) is transmitted to allow for periodic (e.g., hourly) correction of transmitted data, while the reporting interval is less than this period (e.g., every 1-60 minutes). Thus, the data is received, and could be decoded before ECC is used for correction/validation purposes. The packet decoding component can be configured to assemble the hourly corrected data into a data stream. The produced data stream can then be decoded based on the either the packing list defined for normal daily transmittal or the packing list defined for a current asynchronous request. This packet decoding component can be configured to store received bits until enough bits are available and then transmit the collection of packet items to the readings engine component.

Figure 4:
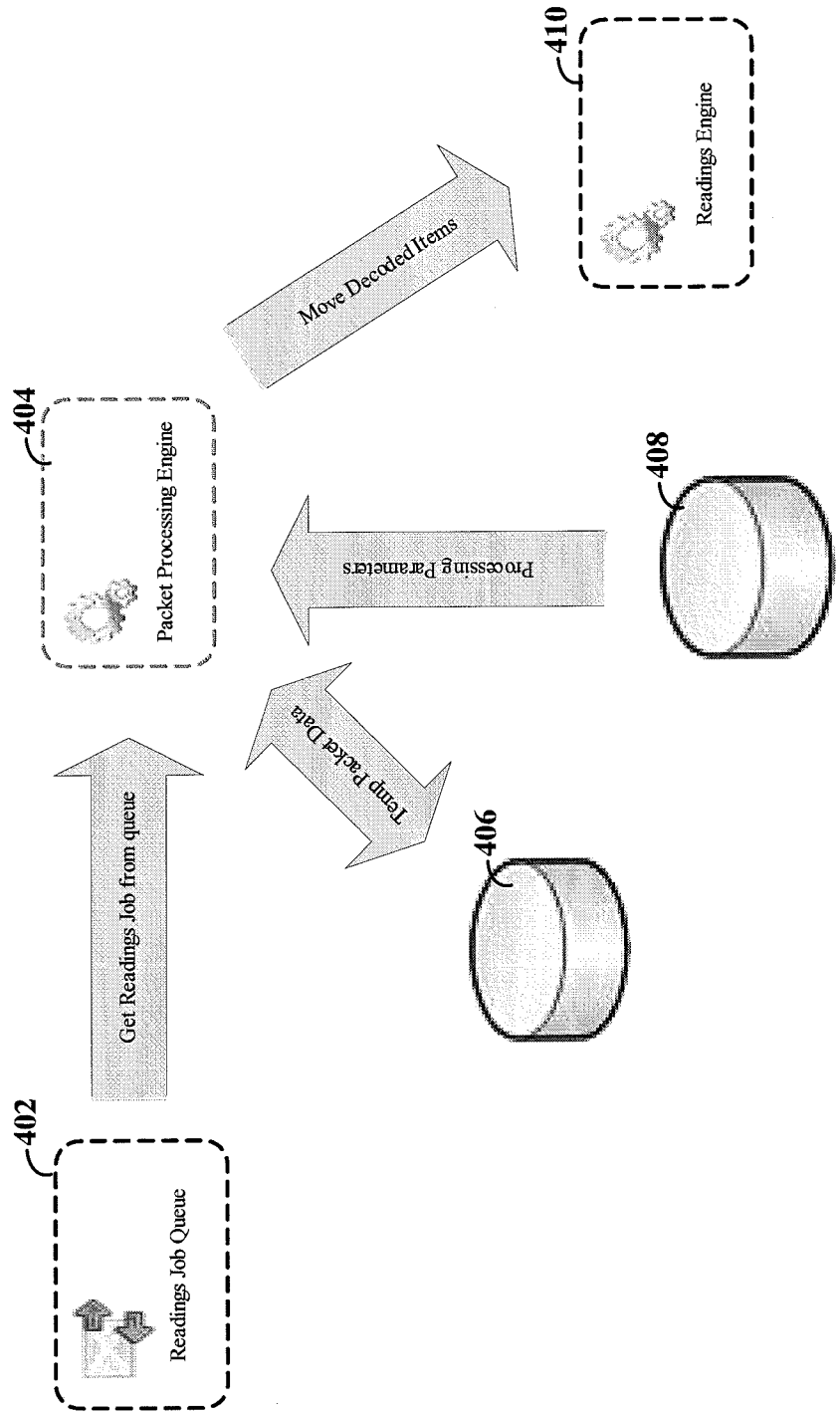
FIG. 4 depicts a block diagram of a packet decoding process, consistent with embodiments of the present disclosure.

FIG. 4 depicts a block diagram of a packet decoding process, consistent with embodiments of the present disclosure. The packet decoding/processing component 404 can be configured to retrieve and process packets that have been submitted to the readings job queue 402. As discussed herein, examples of these packets include short packets, long packets and asynchronous packets. The packet decoding engine 404 can use one or more databases 406 and 408. A first database 406 may be implemented to store packet data during processing and until it is sent to readings engine 410. A second database 408 can be used to store operating parameters (e.g., packing lists) used to decode the packets.

Aspects of the present disclosure recognize that the decoding algorithms used by the packet decoding component can vary according to the modulation scheme used by the endpoints. Accordingly, the packet decoding component can be designed as a separate module relative to subsequent processing. Thus, if endpoints using new modulation schemes are introduced into the system, the packet decoding component can be adjusted with little or no changes made to the downstream processing components.

Figure 5:
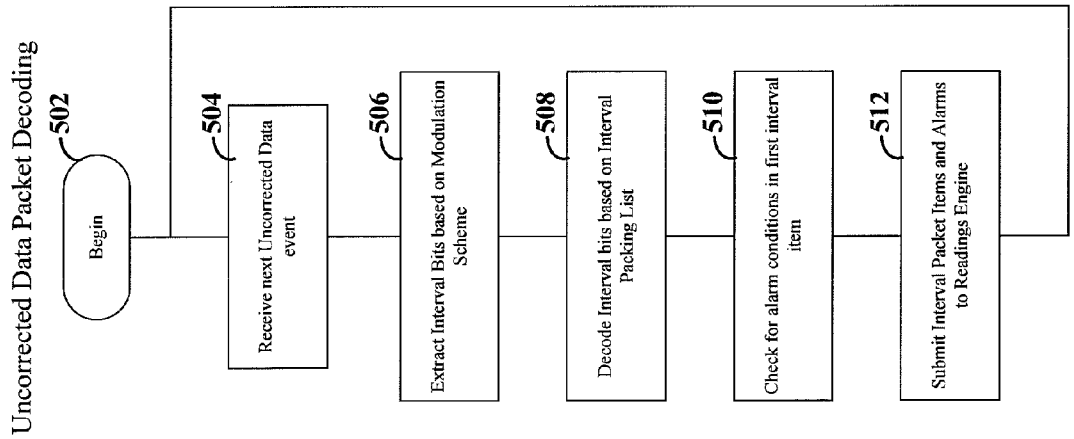
FIG. 5 depicts a flow diagram for decoding of uncorrected data packets, consistent with embodiments of the present disclosure.

FIG. 5 depicts a flow diagram for decoding of uncorrected data packets, consistent with embodiments of the present disclosure. Uncorrected data packets received by the packet decoding component 404 can include several different types of data. Certain embodiments of the present disclosure recognize that, for certain types of data, the uncorrected data can be used as is. For instance, the endpoints can be configured to report utility data (e.g., meter readings that might include overall/peak utility usage) at regular intervals, while communicating the corresponding ECC data for the utility data at a later time. For instance, a particular implementation may provide interval data every 15 minutes over a first hour, while providing ECC data for each of the four intervals over a subsequent hour. Accordingly, the packet decoding component 404 can be configured to process extra bits associated with interval data (interval bits).

More particularly, the process flow begins at block 502 and then advances to block 504. At block 504 an uncorrected data event is received. This uncorrected data event can include a number of different types of data. At block 506, interval bits are extracted. The manner in which the interval bits are encoded and received can vary as a function of the modulation scheme used by the transmitter of an endpoint. For instance, the endpoint might use a type of phase-shift keying (PSK) to encode the data (other possibilities include, but are not limited to, multi-tone solutions, frequency-shift keying (FSK) and OFDMA). The symbol encoding of the endpoint transmitter can be set to allow transmission of the interval data within the desired interval. The symbol bit size can be set according to the desired bandwidth, the line characteristics and other parameters. These and other factors can result in differences in how the data is received and decoded.

At block 508, the extracted interval bits can be decoded by correlating the received data to an interval packing list for the transmitting endpoint. The interval packing list can define which bits of a packet define one or more values. For instance, the interval packing list may indicate that the first eight bits represent a peak utility usage amount for the current (e.g., 1-60 minute) interval and that the next sixteen bits represent the total utility usage amount for the current interval. These bits can therefore be decoded so that the associated, and respective, values can be stored separately.

Embodiments of the present disclosure allow for alarm events to be transmitted using the interval bits. Accordingly, block 510 represents a check for an alarm indication. The alarm indication can be indicated by the transmitted data, for instance, by a particular field (e.g., using reserved codes, an alarm flag bit or flag bits). The packet decoding component 404 then submits the decoded data to a readings engine (at block 512). The process can then repeat for additional data.

Figure 6:
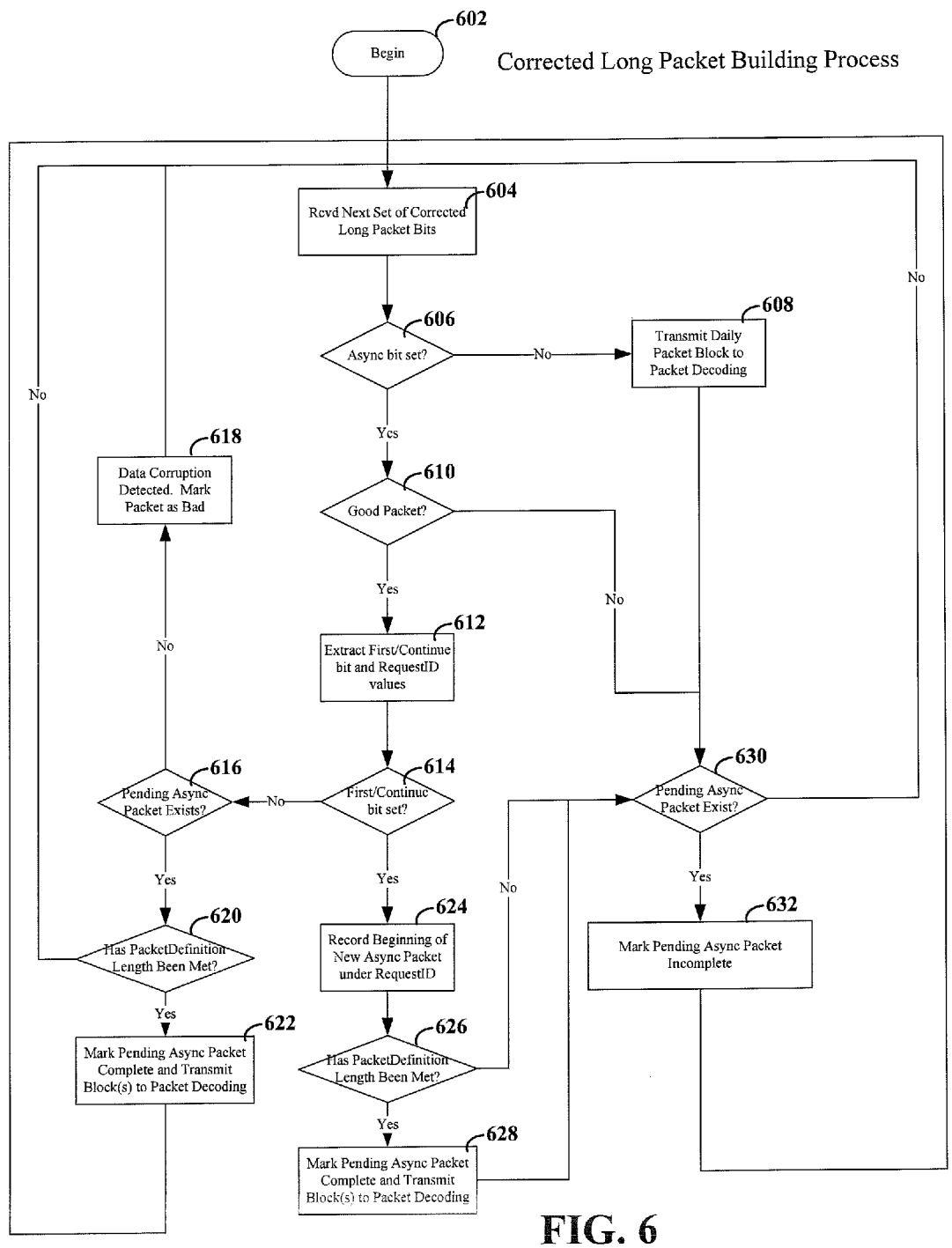
FIG. 6 depicts a flow diagram for building corrected long packets, consistent with embodiments of the present disclosure.

FIG. 6 depicts a flow diagram for building corrected long packets, consistent with embodiments of the present disclosure. Long packets can be received over a relative long period of time and are often not as time-critical as short packets. Accordingly, the packet decoding component 404 can be configured to decode long packets using the corrected version of the long packets. For instance, the corrected version of data for the long packets can be available after ECC data has been received in an hour following the receipt of the long packet data.

The packet building process begins at block 602 and advances to block 604 upon receipt of a (next) set of long packet bits. At block 606, the packet decoding component 404 checks whether the received bits indicate that the data is for an asynchronous packet. This can be indicated by, for instance, one or more data flag bits.

If the packet decoding component 404 determines that the asynchronous bit is not set, then the data bits can be presumed to be part of a (normal) long packet. The data bits are then sent for packet decoding at block 608 (e.g., based upon a long packing list). In certain instances, bits from an asynchronous packet may have been previously received and therefore the packet decoding component 404 may still be waiting for additional bits for this asynchronous packet. Accordingly, the packet decoding component 404 can be configured to check for a pending asynchronous packet at block 630. If there is no pending asynchronous packet, then the process can return to block 604 to process additional bits. If, however, there is a pending asynchronous packet, then the asynchronous packet was not completed because received data was for a long packet. Therefore, the pending asynchronous packet is marked as being incomplete at block 632. The process can return to step 604 to process additional bits.

If the packet decoding component 404 determines that the data bits are for an asynchronous packet (e.g., based upon an asynchronous bit/flag), then the process proceeds to bock 610. At block 610, the packet decoding component 404 can check whether or not the packet is valid. This check can be particularly useful for the situation in which an asynchronous bit/flag has been set due to a data error. If the packet is not valid, then the bits can be discarded and the process can proceed to block 630.

If the packet is valid, then the packet decoding component 404 can check the data to determine whether the data corresponds to a new asynchronous packet or a pending asynchronous packet, as shown in block 612. In certain embodiments, this determination can be made by checking one or more flag bits. Additionally, a request ID can be included in the data (and optionally authentication/CRC data). This request ID can be used to identify whether the packet uses a pre-defined format or a request-specific format.

If the packet decoding component 404 determines that the data indicates that it corresponds to a pending asynchronous packet, then the process proceeds to block 616. At block 616, the packet decoding component 404 checks whether or not there is a pending asynchronous packet. If no such pending asynchronous packet exists, then it can be assumed that there has been corrupted data as indicated by block 618. If there is a pending asynchronous packet, then the current data is assigned to the pending asynchronous packet and packet decoding component 404 next checks whether or not the entire packet has been received, as depicted by block 620. This determination can be made, for instance, by checking the total packet length (e.g., defined by a packing list or otherwise) against the amount of data received. If the packet decoding component 404 determines that the packet length has not been met, then the process returns to block 604 so that additional data can be received and processed. If the packet decoding component 404 determines that the packet length has been met, then the process proceeds to block 622, where the asynchronous packet can then be submitted for packet decoding. Additionally, the packet decoding component 404 can reset the pending asynchronous packet flag that is checked during block 616.

If the packet decoding component 404 determines at block 614, that the current bits represent the first bits of an asynchronous packet, then it can proceed to block 624. At block 624, the packet decoding component 404 can store the new asynchronous packet. This stored data can also be correlated to a request ID.

At block 626, the packet decoding component 404 determines whether or not the packet length has been met, which might occur if the packet length is very short. If the packet length has been met, then the packet decoding component 404 can reset the pending asynchronous packet flag and submit the packet for packet decoding at block 628. If the packet length has not been met, then the packet decoding component 404 can set the pending asynchronous packet flag and advance to block 630.

Consistent with embodiments of the present disclosure, the asynchronous packets may span more than one interval; however, the system can be designed to require that the transmission of asynchronous packets be completed before a set time each day (e.g., midnight). If transmission requires endpoint to transmit data over midnight boundary, endpoint can be configured to stop transmitting after reaching midnight. The asynchronous packets will be left incomplete. The endpoint can also be configured to determine whether the additional bits can be sent before midnight and, if not, such information can be held over for the next day.

Consistent with embodiments of the present disclosure, a packet built to hold the asynchronous packet definition can fill any unused bits (relative to the transmission bandwidth/protocol used) with data item(s) defined according to a long packing list. Thus, the asynchronous packet bits replace/shift normally scheduled data corresponding to long packets.

Figure 7:
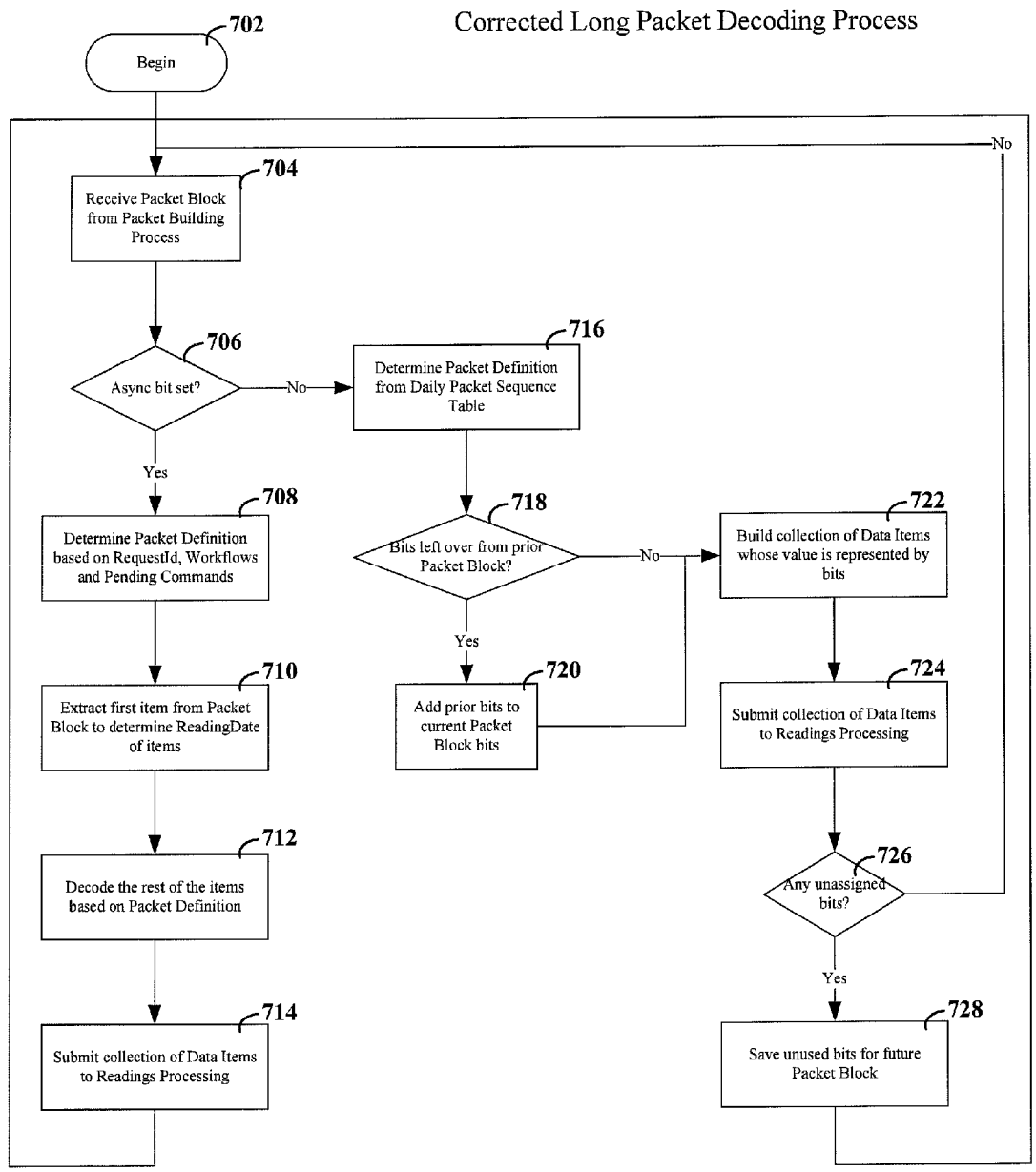
FIG. 7 depicts a flow diagram for decoding corrected long packets, consistent with embodiments of the present disclosure.

FIG. 7 depicts a flow diagram for decoding corrected long packets, consistent with embodiments of the present disclosure. The packet decoding process begins at block 702 and advances to block 704 upon receipt of a packet block from the packet building process. Consistent therewith, the built packet can include data bits that were received over several intervals. The packet decoding process involves determining the particular items represented by the bit values.

At block 706, the packet decoding component 404 can determined whether or not the asynchronous bit has been set. If the answer is yes, then the packet is for an asynchronous packet and therefore is not handled according to the normal long packet decoding process. The process instead proceeds to block 708 where the packet decoding component 404 determines the packet definition for the asynchronous packet. This determination can be made by matching a request ID for the asynchronous packet to a packet definition. The packet definition can be, at least partially defined in response to corresponding work flows, and pending commands.

In certain embodiments, asynchronous packets can be constructed such that the first data item in the packet represents a time or data corresponding to the request. Accordingly, block 710 represents extracting a first item from the packet block in order to determine a reading date for other items in the packet.

Using the packet definition determined at block 702, packet decoding component 404 can decode the remaining items of the packet, as depicted by block 712. This decoding can include matching bit values to corresponding item fields as defined in a packing list. At block 714, the packet decoding component 404 can then submit the decoded items to a readings processing engine. The process then can start again in response to a new packet block being received from the packet building process.

If the asynchronous bit is not set, then the packet corresponds to a long packet, which can be linked to a daily packet sequence table or packing list. The process then proceeds to block 716, to determine the correct packet definition based upon a daily packet sequence table.

The packet decoding component 404 then determines, at block 718, whether there are bits left over from a previously-received packet. This can occur where, for instance, the long packet was split between multiple intervals. In such an instance, the endpoint can slit the bits of a long packet between intervals and it is up to the packet decoding component 404 to reconstruct the split bits of the long packet. Therefore, when there are prior bits left over from a previous packet, the packet decoding component 404 adds the prior bits to the current packet bits at block 720. Thereafter, including where there are no bits left over from the prior packet, a collection of data items is built at block 722. These data items are represented by the bit values from the long packet.

The packet decoding component 404 next submits that collection of built data items to readings processing at block 724. Subsequent to submitting collection of data items to readings processing (at block 724), the packet decoding component 404 checks if there are any unassigned bits at block 726. If there are unassigned bits, they will be saved for a future packet block (shown at block 728). If there are no unassigned bits, the process will restart at block 704.

Figure 8:
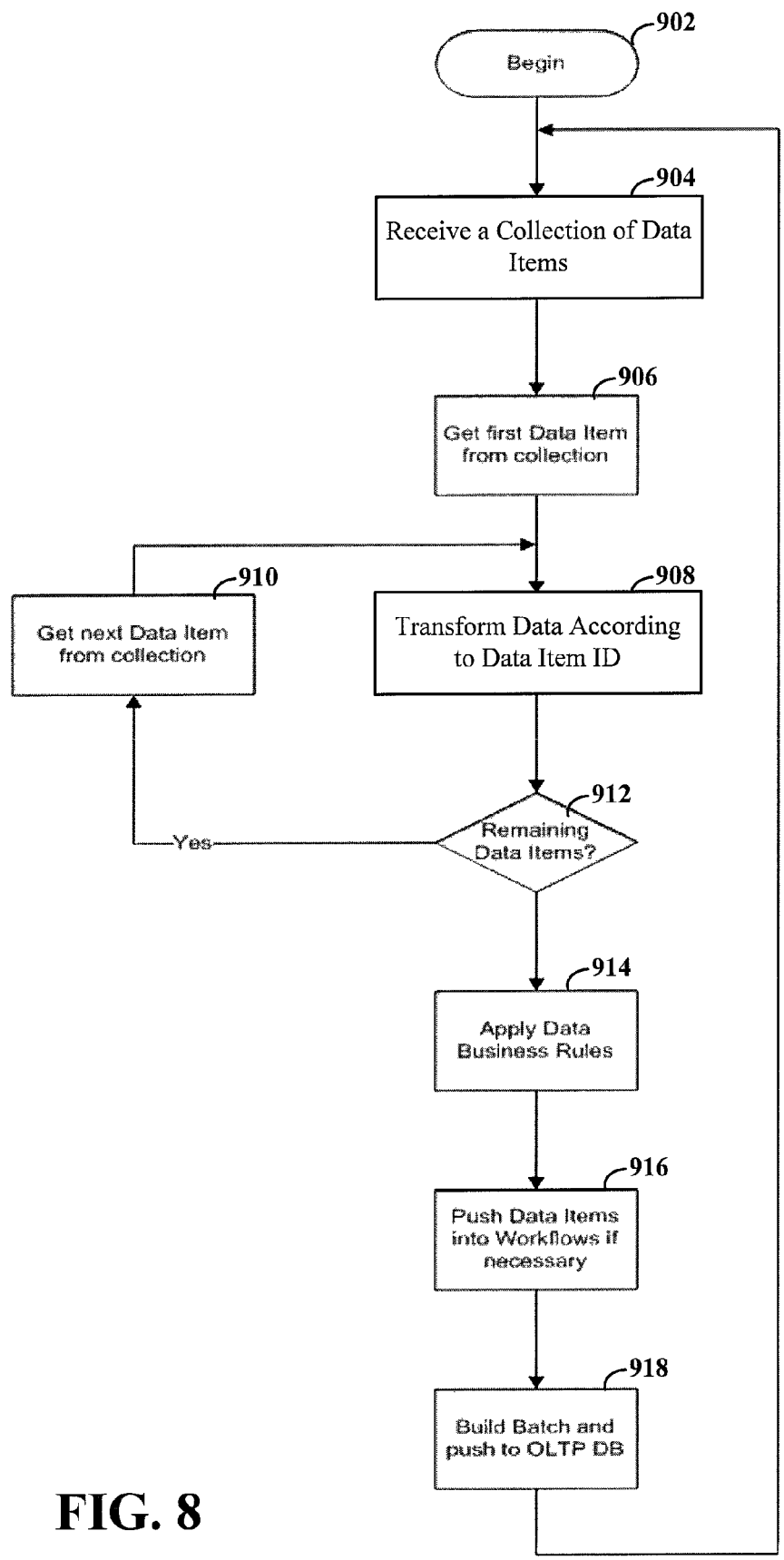
FIG. 8 depicts a flow diagram for transforming data by a readings engine, consistent with embodiments of the present disclosure

FIG. 8 depicts a flow diagram for transforming data by a readings engine, consistent with embodiments of the present disclosure. The process flow begins at step 902 and proceeds to step 904, where the data items are received by the readings engine 806.

The readings engine 806 selects a first item from the data items at block 906. The readings engine 806 can transform the data at block 908 by decoding according to a set of business rules. For instance, the raw value determined from the decoded bits can be applied to algorithms designed to convert the raw values to usable values (e.g., converting to standard units of measurement or otherwise formatting the value). The transformation requirements and algorithms can be drawn from a database that uses a data item identifier as an index. The readings engine 806 can then check whether or not there are any additional items in the current collection, as shown by block 912. If there are additional items, they are retrieved per block 910.

Otherwise, the readings engine 806 proceeds to block 914 where business rules are applied to the transformed data. Consistent with certain embodiments of the present disclosure, these business rules can be used to validate the results to ensure reasonableness. For instance, the business rules can be useful for identifying errors in packets that were not caught using the ECC or other sources of data corruption. For instance, the values can be checked for extreme situations such as unreasonably high meter usage. Failure of these rules usually results in the data being marked non-billable.

Certain embodiments allow for (additional) rules to be defined by individual customers. For instance, a customer may wish to be notified when their utility usage spikes higher than normal, or when voltage readings are not in normal operating parameters.

At block 916 any data items can be pushed into workflows as may be deemed required. A batch can then be built and sent to the database, as depicted at block 918.

Figure 9:
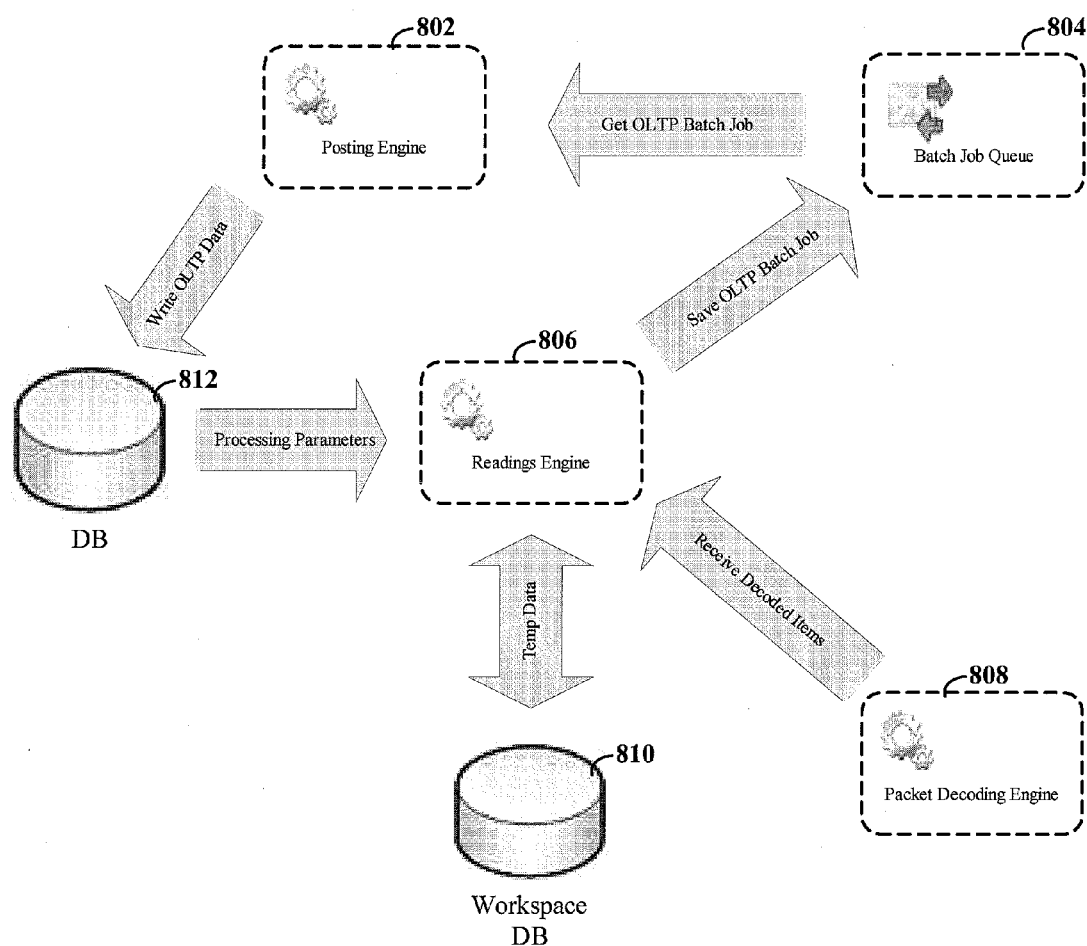
FIG. 9 depicts a block diagram showing the relationship between, among other components, the packet decoding engine and the readings engine, consistent with embodiments of the present disclosure.

FIG. 9 depicts a block diagram showing the relationship between, among other components, the packet decoding engine and the readings engine, consistent with embodiments of the present disclosure. The readings engine component 806 can be configured to receive packet data already broken into a collection of data items by the packet decoding engine 808. This can be particularly useful for decoupling the function of the readings engine component 806 from the endpoint transmission protocol details.

The readings engine component 806 can be configured to process the collection of data items using temporary storage database 810 and transaction-based database 812. Particular embodiments are designed for use with transaction-oriented applications, which are sometimes referred to as online transaction processing (OLTP). The readings engine component 806 can provide its data to a workflow manager component by submitting the data to a job queue 804. A posting engine 802 can operate in response to data in the job queue 804. Feedback to the readings engine 806 can then be provided through database 812.

For instance, data flow begins when the packet decoding component 404 sends one or more decoded packet items to the readings engine 806 component. The readings engine 806 uses data from databases 812 and 810 in order to process data. For instance, temporary data is written directly into the database 810. The posting engine 802 will be responsible for processing jobs from the job queue 804. The posting engine 802 can also write the batches of data into the database 812.

Figure 10:
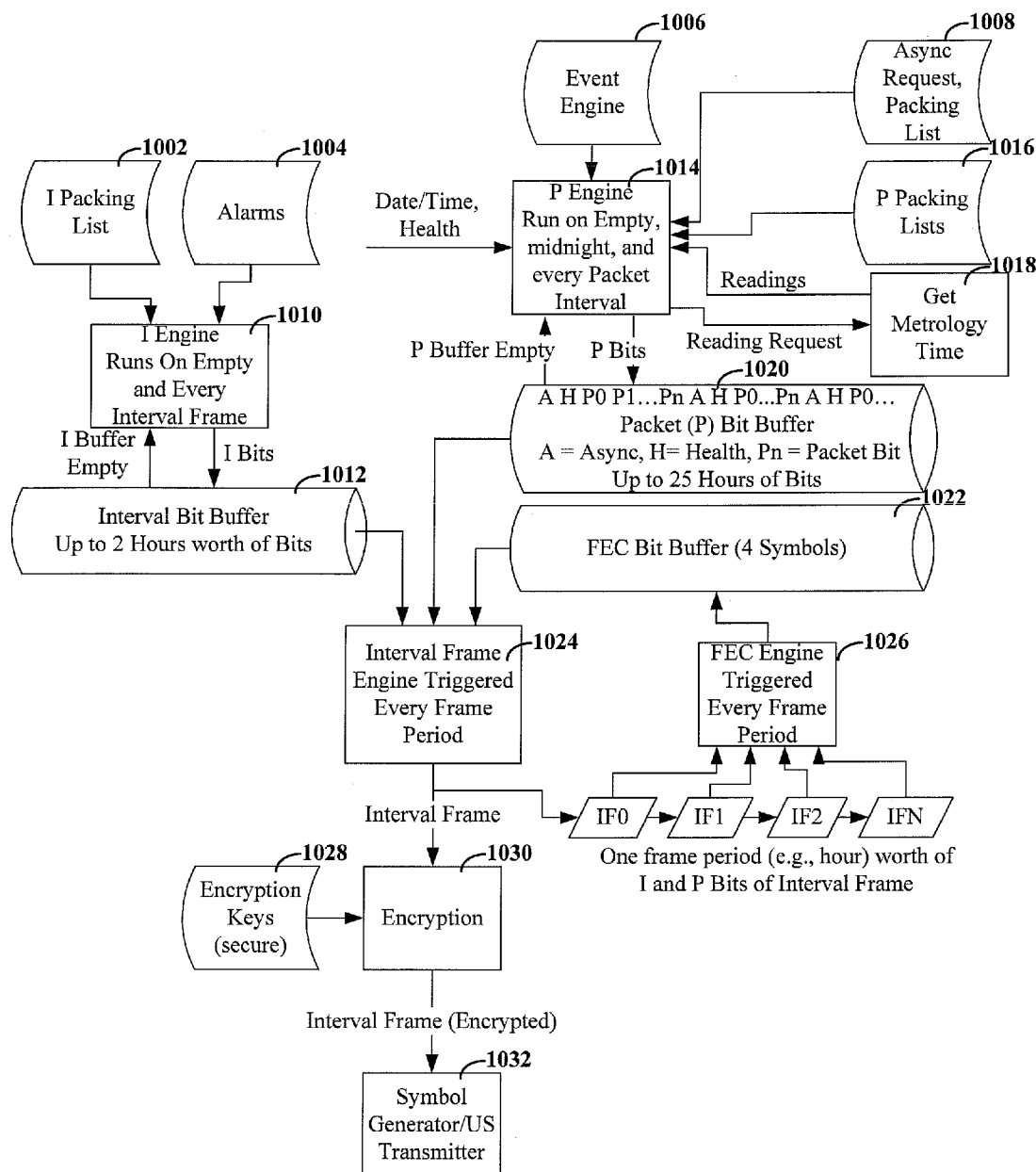
FIG. 10 depicts a flow diagram for packet and symbol generation in an endpoint device, consistent with embodiments of the present disclosure.

FIG. 10 depicts a flow diagram for packet and symbol generation in an endpoint device, consistent with embodiments of the present disclosure. Event engine 1006 responds to various event conditions in order to generate input data for the packet engine 1014. Packet engine 1014 operates to consolidate data other than the interval data. As discussed herein, this other data can be consolidated and transmitted over several different data frame periods. Consistent therewith, packet engine 1014 can be configured and arranged to generate packet (P) bits for placement into packet (P) buffer 1020. Packet engine 1014 can receive data from the event engine 1006 and format the received data according to a bit order defined in the packet lists 1008 and/or 1016. The packet lists can include packing lists 1008, for asynchronous requests, and 1016 for other (long packet) data. Packet engine 1014 can also be configured to request and receive metrology time 1018. An example packet format is shown in packet buffer 1020, although other formats are possible. The first bit "A" indicates whether or not the packet contains asynchronous requests. The second bit "H" indicates whether or not a health condition exists for the endpoint device. For instance, a health condition can indicate that the meter cannot be read, that the endpoint has hardware or memory errors or other problems. Packet bits "Pn" represent data arranged in a manner indicated by the packing list(s) 1008 and/or 1016.

Interval engine 1010 can be configured and arranged to arrange interval data and alarm events according to a bit order defined by the interval (I) packing list 1002. As discussed herein, each interval frame can include a set of data associated with a time period (e.g., 1-60 minutes) associated with that interval. For instance, utility usage information from utility meter(s) can be sent each interval period. In this manner, the utility usage information can be provided each interval period to allow for fast reporting and other usage of the data by the command center. The ordered bits can then be sent to interval bit buffer 1012.

Interval frame engine 1024 can receive bits from both buffers 1012 and 1020 (and also from buffer 1022). An interval frame can be generated that includes data from both buffers. Consistent with optional embodiments, the interval frame can be encrypted 1030 according to a set of encryption keys 1028. The (optionally encrypted) interval frame can then be transformed into symbols 1032 for transmission on power distribution lines using a modulated carrier wave.

Consistent with certain embodiments of the present disclosure, error correction codes can be used to improve data reliability. For instance, a forward error correction (FEC) engine 1026 can produce FEC data that is stored in an FEC buffer 1022. Interval frame engine 1024 can add the FEC data to the interval frame. The collector can then use the FEC to detect, and sometimes correct, data transmission errors. Consistent with particular embodiments of the present disclosure, the FEC data can be generated on several past interval frames. This FEC data can then be interleaved and transmitted with several subsequent interval frames. This can be particularly useful for both allowing the FEC to be split between multiple symbols in the subsequent frame and for allowing the FEC processing to be carried out without delaying transmission of the current interval data.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software. Accordingly, the various components and processes shown in the figures can be implemented in a variety of circuit-based forms, such as through the use of data processing circuit modules (or engines).

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe aspects relating to one or more of communications, protocols, applications, implementations and mechanisms. One such technique is the description of an implementation of a technique expressed in terms of an algorithm or mathematical expression. While such techniques may be implemented, for example, by executing code on a computer, the expression of that technique may be conveyed and communicated as a formula, algorithm, or mathematical expression.

For example, block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions are stored for execution in a manner consistent with one or more of the methods of the present disclosure. The instructions can be used to cause a general-purpose or special-purpose processor that is programmed with the instructions to perform the steps of the methods. The steps may be performed by specific hardware components that contain hardwired logic for performing the steps, or by any combination of programmed computer components and custom hardware components.

Various embodiments of the present disclosure relate to engines or modules that are configured and arranged to perform various functions. The functional description of these engines or modules can represent a specific configuration and arrangement of a particular device to be capable of performing the functional description. In some instances the modules or engines can refer to separate hardware components, while other instances they can refer to a common hardware component configured to carry out multiple functions.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration and should not be construed to necessarily limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency. Such modifications and changes do not depart from the true spirit and scope of the present disclosure, including aspects set forth in the following claims.

What is claimed is:

1. An apparatus for communicating utility-usage data with endpoint devices over power distribution lines that carry power using alternating current (AC), the apparatus comprising:
    a data retrieving engine, including a circuit, configured and arranged to retrieve from the endpoint devices, interval data of a first type and of a second different type of data sets, the first type indicative of utility usage readings and available for retrieval at least once per an interval period, and the second type available for retrieval based on transmissions of the second type of data sets that span at least two interval periods, the second type of data including long packets that are characterized as being generated from an aggregation of multiple bits communicated over multiple interval periods;
    a packet processing engine, including a circuit, configured and arranged to
        access first and second application-customized packing lists and to respond to the data as retrieved by the data retrieving engine by extracting the data sets of the first type and of the second type and forming groups of discrete values for the extracted data sets of the first type and of the second type based respectively on the first and second packing lists, and
        generate data packets in response to and as a function of the groups; and
    a packet reading engine, including a circuit, configured and arranged to interpret the generated data packets according to a set of packet-communication rules, and output therefrom interpreted data indicative of the data sets of the first type and of the second type, including interpreted data indicative of the retrieved utility usage readings, for communicating data, including both types of data sets, on behalf of a utility provider.

2. The apparatus of claim 1, wherein the second type of data includes at least one of billing information and power quality metrics, and wherein interval data is also communicated during each of the multiple interval periods.

3. The apparatus of claim 1, wherein multiple packets are aggregated based upon respective collectors groups before the multiple packets are provided to the packet reading engine.

4. The apparatus of claim 1, wherein the discrete values for the extracted data sets of the first type correspond to meter reading values and wherein different endpoint devices use different packing lists.

5. The apparatus of claim 1, wherein the packet reading engine is further configured and arranged to detect alarm events in the extracted data sets.

6. The apparatus of claim 1, wherein the packet reading engine is further configured and arranged to detect asynchronous packets that do not correspond to either of the first and second packing lists.

7. The apparatus of claim 1, wherein the packet reading engine is further configured and arranged to detect alarm events in the first type of data sets.

8. The apparatus of claim 1, wherein the packet reading engine is further configured and arranged to apply business rules to detect unreasonable data values for the retrieved utility usage readings.

9. The apparatus of claim 1, wherein the packet reading engine is further configured and arranged to apply business rules that detect customer-defined conditions and to provide a notification to the customer in response to detection of at least one customer-defined condition.

10. The apparatus of claim 1, wherein the interval period corresponds to a 1-60 minute interval period in which meter usage data for a prior interval period is transmitted at least once every interval.

11. A method for communicating utility-usage data with endpoint devices over power distribution lines that carry power using alternating current (AC), the method comprising:
    retrieving, from the endpoint devices, interval data communicated for indicating utility usage readings provided at least once per an interval period used by each of the endpoint devices;
    retrieving from the endpoint devices another different type of data that is transmitted at times that overlap multiple interval periods, the other different type of data including long packets that are characterized as being generated from an aggregation of multiple bits communicated over multiple interval periods;

extracting the interval data from a series of data bits received from the endpoint devices;

mapping the extracted interval data to data fields using an interval packing list;

extracting the other different type of data, as transmitted at times which overlap interval periods, from the series of data bits received from the endpoints;

mapping the extracted other type of data to data fields using another different type of packing list;

generating data packets according to the mappings wherein the data packets represent the extracted interval data and the extracted other different type of data; and transmitting a configuration request to the endpoints devices, wherein the configuration request includes a request to modify an amount of interval data transmitted during the interval periods, the amount of interval data is offset by a change to an amount of the other different type of data transmitted during the interval periods.

12. A method for communicating utility-usage data with endpoint devices over power distribution lines that carry power using alternating current (AC), the method comprising:

retrieving, from the endpoint devices, interval data communicated for indicating utility usage readings provided at least once per an interval period used by each of the endpoint devices;

retrieving from the endpoint devices another different type of data which data is transmitted at times that overlap multiple interval periods;

extracting the interval data from a series of data bits received from the endpoint devices;

mapping the extracted interval data to data fields using an interval packing list;

extracting the other different type of data, as transmitted via at times which overlap interval periods, from the series of data bits received from the endpoints;

mapping the extracted other different type of data to data fields using another different type of packing list;

generating data packets according to the mappings wherein the data packets represent the extracted interval data and the extracted other different type of data;

transmitting a configuration request to the endpoints devices, wherein the configuration request includes a request to modify an amount of interval data transmitted during the interval periods, the amount of interval data offset by a change to an amount of the other different type of data transmitted during the interval periods; and coordinating data received from a particular endpoint, the data being received from multiple collectors of a collector switching group.

13. The method of claim 12, wherein multiple versions of the same data are received from the multiple collectors and the step of coordinating data includes selecting a particular version of data from the multiple versions.

14. The method of claim 12, wherein the step of coordinating data includes compensating for backfeed situations on the power distribution lines.

15. A method for transmitting data over power distribution lines that carry power using alternating current (AC), the method comprising:

collecting, at an endpoint device, utility usage readings at least once per an interval period;

classifying a first set of data as not divisible over the interval period, the first set of data including the utility usage readings;

classifying a second set of data as divisible over the interval period, the second set of data including long packets that are characterized as being generated from an aggregation of multiple bits communicated over multiple interval periods;

dividing the second set of data according to a mapping list;

generating a transmission block of data that includes the first set of data and a portion of the second set of data, the generation being responsive to a stored parameter that defines a ratio of the first set of data to the portion of the second set of data set;

transmitting the block of data during a single interval period;

receiving configuration data requesting a change to the stored parameter; and adjusting, for subsequent interval periods, the ratio in response to the requested change.

16. The method of claim 15, further including a step of transmitting, during another interval period, a second block of data that includes another portion of the second set of data.

17. An endpoint device for transmitting data over power distribution lines that carry power using alternating current (AC), the endpoint device comprising:

a memory circuit configured and arranged to collect utility usage readings at least once per an interval period; and data processing circuitry configured and arranged to classify a first set of data as not divisible over the interval period, the first set of data including the utility usage readings;

classify a second set of data as divisible over the interval period, the second set of data including long packets that are characterized as being generated from an aggregation of multiple bits communicated over multiple interval periods;

divide the second set of data according to a mapping list;

generate a transmission block of data that includes the first set of data and a portion of the second set of data, the generation being responsive to a stored parameter that defines a ratio of the first set of data to the portion of the second set of data set;

transmit the block of data during a single interval period;

receive configuration data requesting a change to the stored parameter; and adjust, for subsequent interval periods, the ratio in response to the requested change.

18. The device of claim 17, wherein the data processing circuitry is further configured and arranged to adjust the mapping list in response to received reconfiguration requests.

19. The device of claim 17, wherein the data processing circuitry is further configured and arranged to classify a second set of data as asynchronous data.

20. The device of claim 17, wherein the second set of data includes at least one of billing information and power quality metrics.

* * * * *